United States Patent [19]

Arthur et al.

[11] Patent Number: 5,598,427
[45] Date of Patent: *Jan. 28, 1997

[54] WIRELESS ALARM SYSTEM

[75] Inventors: James D. Arthur, Costa Mesa, Calif.; H. Britton Sanderford, Jr., New Orleans; Robert E. Rouquette, Kenner, both of La.

[73] Assignee: Axonn Corporation, New Orleans, La.

[*] Notice: The portion of the term of this patent subsequent to Feb. 28, 2014, has been disclaimed.

[21] Appl. No.: 782,345

[22] Filed: Oct. 24, 1991

Related U.S. Application Data

[62] Division of Ser. No. 569,682, Aug. 20, 1990, Pat. No. 5,095,682, which is a continuation of Ser. No. 266,461, Nov. 2, 1988, Pat. No. 4,977,577.

[51] Int. Cl.$^6$ ................................................ H04B 1/69
[52] U.S. Cl. .......................... 375/200; 380/34; 380/48; 375/208; 375/365; 375/367
[58] Field of Search .................... 375/1, 76, 82, 375/96, 103, 110, 114, 115, 200–210, 317–319, 328, 343, 350, 359, 360, 361, 365, 367; 380/34, 48

[56] References Cited

U.S. PATENT DOCUMENTS

| | | | |
|---|---|---|---|
| 3,351,943 | 11/1967 | Bush et al. | 375/96 X |
| 4,193,030 | 3/1980 | Rabow et al. . | |
| 4,222,115 | 9/1980 | Cooper et al. . | |
| 4,225,935 | 9/1980 | Zscheile, Jr. et al. . | |
| 4,241,447 | 12/1980 | Epstein . | |
| 4,313,211 | 1/1982 | Leland . | |
| 4,317,204 | 2/1982 | Gordy et al. . | |
| 4,351,064 | 9/1982 | Ewanus . | |
| 4,360,801 | 11/1982 | Duhame . | |
| 4,361,890 | 11/1982 | Green, Jr. et al. . | |
| 4,361,891 | 11/1982 | Lobenstein et al. . | |
| 4,387,465 | 6/1983 | Becker . | |
| 4,392,220 | 7/1983 | Hirosaki et al. . | |
| 4,400,790 | 8/1983 | Chambers et al. | 375/96 X |
| 4,418,393 | 11/1983 | Zscheile, Jr. . | |
| 4,425,661 | 1/1984 | Moses et al. . | |
| 4,435,821 | 3/1984 | Ito et al. . | |
| 4,455,651 | 6/1984 | Baran . | |
| 4,468,784 | 8/1984 | Jagnow et al. . | |
| 4,470,145 | 9/1984 | Williams . | |
| 4,472,814 | 9/1984 | Gutleber . | |
| 4,475,215 | 10/1984 | Gutleber . | |
| 4,484,335 | 11/1984 | Mosley et al. . | |
| 4,511,887 | 4/1985 | Fiore . | |
| 4,517,600 | 5/1985 | Reitmeier . | |
| 4,530,008 | 7/1985 | McVoy . | |
| 4,550,312 | 10/1985 | Galloway et al. . | |
| 4,583,090 | 4/1986 | Eden et al. . | |
| 4,594,580 | 6/1986 | Nelson . | |
| 4,627,080 | 12/1986 | Debus, Jr. | 375/110 |
| 4,661,804 | 4/1987 | Abel . | |
| 4,728,935 | 3/1988 | Pantus et al. . | |
| 4,734,680 | 3/1988 | Gehman et al. . | |
| 5,093,846 | 3/1992 | Walton, Jr. et al. | 375/96 |

OTHER PUBLICATIONS

R. C. Dixon, *Spread Spectrum Systems;* (Wiley Interscience, 1984); p. 231, FIG. 6. 8(a).

*Primary Examiner*—Bernarr E. Gregory
*Attorney, Agent, or Firm*—Oblon, Spivak, McClelland, Maier & Neustadt, P.C.

[57] ABSTRACT

A wireless alarm system using spread spectrum transmitters, fast frequency shift keying, spread spectrum receivers and computer with a display. The spread spectrum transmitter includes an oscillator coupled to a microprocessor with chip code generation means, preamble register, address register and data register. The spread spectrum receiver acquires synchronization of the spread spectrum signal using a microprocessor coupled to the quieting, signal strength or baseband output of the receiver, with a two step algorithm. The steps comprise achieving a coarse lock and a fine lock to the spread spectrum signal.

11 Claims, 8 Drawing Sheets

WIRELESS ALARM SYSTEM

This application is a division of application Ser. No. 07/569,682, filed Aug. 20, 1990, now U.S. Pat. No. 5,095, 682.

BACKGROUND OF THE INVENTION

This invention relates to a wireless warning system for use in a large office building, and more particularly a wireless fire warning and detection system which employs spread spectrum technology with high reliability for continuously monitoring the building.

DESCRIPTION OF THE PRIOR ART

A number of systems and techniques have been employed in the prior art as a warning system for large buildings. These include having warning sensors for detecting fire, security, or other means wired directly to a main console, with indicators that a particular sensor has been activated. Systems also have been developed employing a radio link between the sensor and receiver. For example, U.S. Pat. No. 4,550,312 to Galloway et al. teaches the use of wideband sensors and transmitters. The sensors/transmitters transmit digital information to a central station by radio. These transmissions of messages are proceeded by an additional access code to identify a particular property. This increases the message overhead, however, which lowers system throughput and lowers battery life.

U.S. Pat. No. 4,661,804 to Abel discloses a receiver-decoder used with a plurality of encode or transmitter units using digitally encoded addresses. This use of multiple redundant 35 second interval short transmissions is used to achieve reliable throughput.

U.S. Pat. No. 4,734,680 to Gehman et al. teaches the use of a pseudorandom number to lower probability of repeat data collisions. The Gehman invention provides for only four bits or sixteen time slot positions over which to transmit, which are inadequate for large systems with hundreds of transmitters. The Gehman disclosure does not teach the use of a randomization interval with hundreds of possible of time slots with spread spectrum so that a destructive data collision can only occur in one chip time. Further, the Gehman patent does not teach the use of the transmitters unique address as a seed to the pseudorandom number generator, preventing two transmitters from drifting into lockstep transmitting schedule.

OBJECTS AND SUMMARY OF THE INVENTION

An object of the present invention is to provide a wireless warning system having a high reliability for transmitting digital data via radio waves from an alarm or data transmission device to a remotely located receiver.

Another object of the invention is to provide a wireless warning system capable of data error detection and error correction using redundancy, for increasing communications reliability.

A further object of the invention is to provide a wireless warning system having a safety margin against jamming and undesirable interference.

According to the present invention, as embodied and broadly described herein, a wireless warning system is provided comprising a plurality of sensors coupled to a plurality of spread spectrum transmitters, respectively. The plurality of sensors are for detecting or warning against smoke, heat, unauthorized entry, or other sensing device to indicate some particular function in a room of a building. The system further includes at least one spread spectrum receiver having polar diversity antennas and microprocessor having a display, with the microprocessor coupled to the spread spectrum receivers.

An apparatus coupled to a modulation input of an oscillator of a spread spectrum transmitter is provided for controlling the spread spectrum transmitter, which includes chip-code-generation means, preamble means, address means, and data means. The chip-code-generation means can be embodied as a recirculating register, the preamble means can be embodied as a preamble register, the address means can be embodied as an address register, and the data means can be embodied as a data register. The recirculating register is coupled to the modulation input of the oscillator for storing the spread spectrum code. The recirculating register also outputs the spread spectrum chip code as a modulating voltage to the modulation input of the oscillator. The preamble register is coupled to the modulation input of the voltage controlled oscillator. The preamble register stores a preamble, and outputs, during a transmitting interval, the preamble as a modulating voltage to the modulation input of the voltage controlled oscillator. The preamble may include a coarse lock preamble and a fine lock preamble.

The address register is coupled to the modulation input of the voltage controlled oscillator through the preamble register. The address register stores a device address and a type code, and outputs, during a transmitting interval, the device address and the type code as a modulating voltage to the modulation input of the voltage controlled oscillator.

The data register is coupled to the data input and to the modulation input of the voltage controlled oscillator through the preamble register and the address register. The data register stores data received from the data input, and outputs, during the transmitting interval, the data as a modulating voltage to the modulation input of the voltage controlled oscillator.

The present invention further includes a error detection means coupled to the data register for putting a redundancy check code word at the end of a data sequence, for error detection.

A timing circuit is provided coupled to the enable input of the voltage oscillator for enabling the voltage controlled oscillator during the transmitting interval. The timing circuit also is coupled to the keying input of the RF power amplifier for enabling an RF power amplifier during the transmitting interval. Additionally, a pseudorandom sequence generator is coupled to the timing circuit for generating a random number for modifying the timing duration between each transmitting interval.

The present invention also includes an apparatus for generating a spread spectrum chip code for use with a receiver, including means for entering the spread spectrum chip code having n single chips. The entering means may be embodied as a hand terminal. The apparatus further includes memory means for storing chip words, each chip word having a plurality of bits. The memory means may include a random access memory (RAM) or other memory device. Also included is a processing means coupled to the entering means and to the memory means, and responsive to receiving the spread spectrum chip code for transforming a single chip of the spread spectrum chip code to a chip word and storing the chip word in memory means. The processing means may be, for example, a microprocessor or other electronic circuit device to accomplish these functions. Additionally, counting means are included coupled to the memory means for sequencing through n addresses of the chip words stored in the memory means, and sequentially outputting the chip words to the receiver.

The present invention further includes an apparatus for synchronizing spread spectrum chip code using a two step algorithm in a process coupled to a receiver having a quieting output. The apparatus includes means for correlating a first signal from the quieting output of the receiver with multiple code iterations of the spread spectrum chip code by comparing the first signal to an adaptive average to be exceeded by a preset margin. The means for correlating includes determining whether the amplitude of the first signal exceeds the preset margin. Included are means coupled to the correlating means for computing the adaptive average, in response to the first signal not exceeding the preset margin. The computing means adds the amplitude of the first signal to the previously computed adaptive average. Means coupled to the quieting output of the receiver is provided for correlating a second signal in response to the first signal exceeding the preset margin. The second signal is correlated with a portion the time duration of multiple code iterations of the spread spectrum signal. The means for correlating the second signal compares the amplitude of the second signal to an adaptive average by a preset margin to determine whether the second signal exceeds the preset margin.

A second species of the spread spectrum chip code synchronization method and apparatus, according to the present invention, is provided. The second species includes the spread spectrum chip code synchronization apparatus coupled to a baseband output of a receiver. The apparatus includes means coupled to the baseband output of the receiver for sampling and digitizing a plurality of analog signals from the baseband output of the receiver, for generating a plurality of data signals. Each of the analog baseband signals is sampled and digitized during one chip time. Register means are provided, coupled to the sampling and digitizing means, for shifting the plurality of data signals sequentially through a plurality of shift registers. Means is provided coupled to the register means for adding in parallel each of the plurality of data signals stored in the plurality of registers according to a plurality of predetermined weights for each of the plurality of data signals. The adding means generates a correlation sum.

Comparing means coupled to the adding means compares the correlation sum to a preset margin. Means coupled to the comparing means dithers a chip clock by at least one portion of one chip time, thereby improving clock lock.

A third species of the spread spectrum chip code synchronization apparatus is provided according to the present invention. The apparatus comprises means coupled to the baseband output of the receiver for sampling and digitizing a plurality of analog signals from the baseband output of the receiver. The sampling and digitizing means also generates a plurality of data signals. Each of the analog signals is sampled and digitized during one chip time.

Register means also is provided in the third species of the spread spectrum chip code synchronization apparatus, according to the present invention, coupled to the sampling and digitizing means for shifting and recirculating the plurality of data signals sequentially through a plurality of shift registers. Means additionally is provided coupled to the register means for adding sequentially the data signals passing through one of the shift registers according to a predetermined weighting algorithm.

Additional objects and advantages of the inventions will be set forth in the description which follows, and in part will be obvious from the description, or may be learned by practice of the invention.

BRIEF DESCRIPTION OF THE DRAWINGS

The accompanying drawings, which are incorporated in and constitute a part of this specification, illustrate a preferred embodiment of the invention, and together with the description, serve to explain the principles of the invention.

DETAILED DESCRIPTION OF THE PREFERRED EMBODIMENTS

Reference will now be made to the present preferred embodiments of the invention, examples of which are illustrated in the accompanying drawings.

Wireless Warning Detection System

Figure 1:
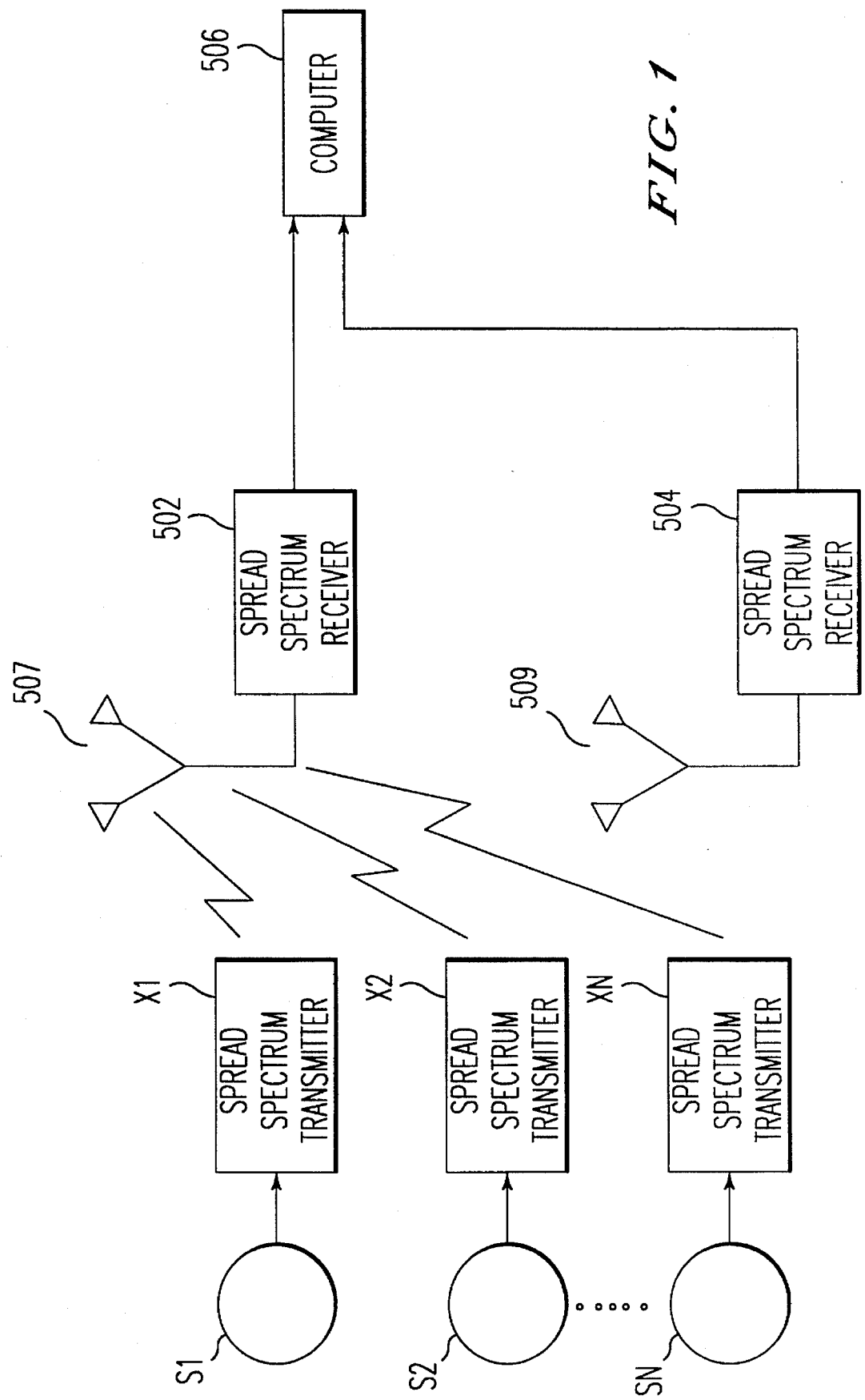
FIG. 1 is a block diagrammatic view of the wireless sensor and detector system according to the present invention.

FIG. 1 illustrates the wireless warning system of the present invention. A plurality of sensors S1, S2, . . . , SN, are coupled to a plurality of spread spectrum transmitters X1, X2, . . . , XN, respectively. Also shown are the elements of a base station including a first spread spectrum receiver 502 and a second spread spectrum receiver 504, each of which are coupled to polar diversity antennas 507, 509, respectively. A microprocessor 506 having a microprocessor display is coupled to the first spread spectrum receiver 502 and the second spread spectrum receiver 504. The wireless warning detection system of FIG. 1 provides a high reliability for transmitting digital data via radio waves from a sensor S1, S2, . . . , SN. The sensor S1, S2, . . . , SN may be, for example, a smoke head detector, a security sensing device, or other initiating device or modulating device. As set forth below, the high reliability of the system includes means for data error detection and error correction.

The preferred embodiment consists of many sensor devices S1, S2, . . . , SN which may be a smoke detector, pull station, contact alarm, waterflow detector, guard station, or security access controller. These can be expanded directly to include voice modulation, local area network data link, long-range alarm monitoring, remote power meter reading, remote process control, etc.

The initiating device provides either a contact input or reflected light smoke chamber level or data byte to the spread spectrum transmitters X1, X2, . . . , XN. The spread spectrum transmitters X1, X2, . . . , XN include means for data message encoding in serial form and data integrity validation, means for re-sending the message to achieve redundancy, means for randomizing the message transmit interval to avoid repeat collisions, means for modulating the serial message into spread spectrum form and means for transmitting the spread spectrum carrier at the desired frequency.

The spread spectrum receiver's antennas 507, 509 minimize signal fading via polar diversity. Using two receivers provides redundancy as a primary and secondary means for receiving transmissions. The two polar diversity antennas provide spatial diversity against signal fading. The spread spectrum receiver 507, 509 collects the RF energy from polar diversity antenna 507, 509 and filters out undesirable frequencies. The receivers compare and synchronize desirable frequencies to the spread spectrum code of interest thereby extracting the original serial transmission. The spread spectrum receivers 507, 509 further validate the serial transmitter message and forward this information to computer 508 for display.

The spread spectrum of the present invention, in a preferred embodiment, uses fast frequency shift keying (FFSK). The techniques disclosed below are equally applicable for frequency hopping or phase shift keyed spread spectrum methods.

Transmitter

Figure 2:
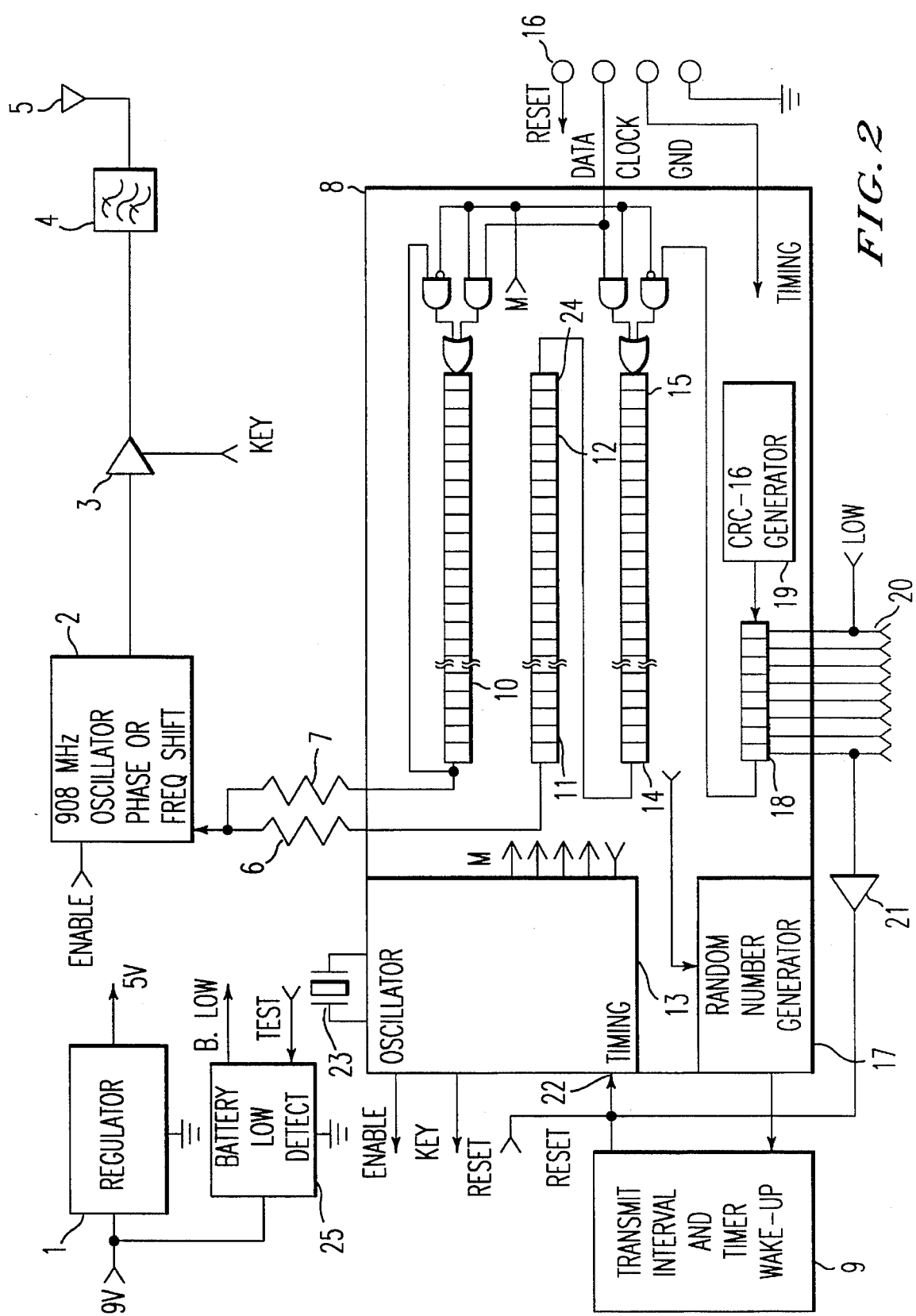
FIG. 2 is a schematic diagram of a spread spectrum transmitter.

Referring to FIG. 2, a preferred embodiment of the transmitter of the instant invention is shown including chip-code-generation means, preamble means, address means, data means, timing means, pseudorandom-sequence means, and error-detection means. The chip-code-generation means may be embodied as a recirculating register 10 and the preamble means may be embodied as a preamble register 11. The chip-code-generation means may be embodied as a shift register with exclusive ORed feedback taps. The address means may be embodied as an address register 14, the data means may be embodied as a data register 18, and the error-detection means may be embodied as cyclical-redundancy-check (CRC) generator 19. The timing means may be embodied as timing circuit 13, and the pseudorandom sequence means may be embodied as the random number generator 17.

In the exemplary arrangement shown, a microprocessor 8 includes the recirculating register 10, preamble register 11, address register 14, data register 18, CRC generator 19, random number generator 17, and timing circuit 13. The timing circuit 13 is embodied as a timing algorithm in software, located in microprocessor 8. Alternatively, these registers and circuits may be put together with discrete components or independently wired and constructed as separate elements, as is well known in the art.

As shown in FIG. 2, an oscillator, which is shown as a voltage controlled oscillator 2 is coupled to an RF power amplifier 3, and the RF power amplifier 3 is coupled through a bandpass filter 4 to a micropatch or equivalent antenna 5. The voltage controlled oscillator 2 includes an enable input and a modulation input, where the voltage controlled oscillator generates a spread spectrum signal in response to a modulating voltage being applied to the modulation input. The voltage controlled oscillator 2 is enabled by applying an enable signal to the enable input. The RF power amplifier 3 has a keying input and will amplify a signal from the voltage controlled oscillator 2 only if a keying signal is applied to the keying input. The voltage controlled oscillator 2 alternatively can be frequency locked to the microprocessor's crystal to improve stability. The voltage controlled oscillator 2 also can be replaced by a capacitor and inductor tuned oscillator and a phase shift keyed modulator, or any other means for generating a signal.

The microprocessor 8 is coupled to the modulation input of the voltage controlled oscillator 2 through first resistor R6 and second resistor R7. The microprocessor 8 broadly controls the voltage controlled oscillator 2 by supplying an enable signal to the enable input of the voltage controlled oscillator 2, and a modulating voltage to the modulation input of the voltage controlled oscillator 2. Also, the microprocessor 8 controls the RF power amplifier 3 by supplying a keying signal to the keying input of the RF power amplifier 3.

Included in the microprocessor 8 is a recirculating register 10 coupled to the modulation input of the voltage controlled oscillator 2 through second resistor R7. The recirculating register 10 stores a spread spectrum chip code, and outputs, during a transmitting interval, the spread spectrum chip code as a modulating voltage to the modulation input of voltage controlled oscillator 2.

The preamble register 11 is coupled to the modulation input of the voltage controlled oscillator 2 through first resistor R6. The preamble includes the coarse lock preamble and the fine lock preamble. The preamble register 11 stores a coarse lock preamble in cells 12 and a fine lock preamble in cells 24. The preamble register 11 outputs during the transmitting interval, the coarse lock preamble and the fine lock preamble as a modulating voltage to the modulation input of the voltage controlled oscillator 2 through first resistor R6. First resistor R6 and second resistor R7 are chosen such that the desired spreading from the chip code and the data coming from the preamble register 11 is achieved.

Also shown in FIG. 2 is an address register 14 coupled to the modulation input of the voltage controlled oscillator 2 through the preamble register 11 and first resistor R6. The address register 14 stores a device address and a type code, and outputs during a transmitting interval, the device address and type code as a modulating voltage to the modulation input of the voltage controlled oscillator 2.

A data register 18 is coupled to a data input 20 and to the modulation input of the voltage controlled oscillator 2 through the preamble register 14 and the address register 11. The data register 18 stores data received from the data input, and outputs, during the transmitting interval, the data as a modulating voltage to the modulation input of the voltage controlled oscillator 2. The data from the preamble register 11, address register 14, and data register 18 are outputted in sequence, and at the end of a sequence, the cyclical redundancy check generator 19 outputs a data word at the end of the code for error detection.

A timing circuit 13 is included in microprocessor 8, and is coupled to the enable input of the voltage controlled oscillator 2 and to the keying input of the RF power amplifier 3 for enabling the voltage controlled oscillator 2 and the RF power amplifier 3, by outputting an enable signal to the enable input and a keying signal to the keying input of the RF power amplifier 3, respectively, during the transmitting interval. In essence, voltage controlled oscillator 2 and RF power amplifier 3 are not active or activated during a time duration of non-transmission, and are only activate during a transmission interval. The time duration between transmission intervals is made to vary in response to the random number generator 17 generating a random number and transferring the random number to the timing circuit 13. The random number modifies the timing duration between each transmitting interval randomly.

Also shown are the voltage supply, regulator circuit 1, and battery low detector 25.

The spread spectrum transmitter monitors one or more data inputs 20 and transmits periodically a supervisory data message. One or more of the data inputs 20 can be set 21 such that they cause a priority transmission at an increased rate higher than the supervisory message rate.

During installation of the transmitter, a device address (1-4095) 12, "Type" code 15 (fire, security, panic, heat, pull station, etc.) stored in preamble register 11, and a spread spectrum chip code stored in recirculating register 10 are loaded via programing connector 16. At installation time the "Panel" computer assigns the device ID address to each room number or unique device in the system which is to be monitored. The panel computer then prints a sticky label with the device's ID, address, type code and spread spectrum chip code, both in decimal and bar code form. The label is fixed to the smoke detector or alarming device and via the programming connector 16, or the number can be entered manually with the aid of a hand-held terminal. Alternatively a bar code reader can be connected to the programming connector 16 and the device can be read electronically from the bar code and entered into the transmitter. Microprocessor timing is controlled by crystal 23. Transmit timing is controlled by the wake-up timer 9, which has its own low power oscillator.

In operation, the transmitter sends a supervisory message often enough so that the receiver can detect failure of any transmitter within 200 seconds. The microprocessor 8 effectively "sleeps" between these transmissions to conserve battery life while counter 9 counts down to wake-up microprocessor 8. In order to minimize the chance of reoccurring data collisions from multiple simultaneous transmitters, the transmit interval is modified by random number generator 17. Very fine resolution intervals are used equal to 500 temporal transmit positions. The random number generator 17 is seeded with the transmitter's unique address 14, resulting in different transmit schedules for each unit, thereby avoiding continuous collisions between transmitters.

Once the microprocessor 8 is reset by the wake-up circuit 9 the timing circuit 13 allows the crystal 23 to stabilize for 1–5 ms. The timing circuit 13 then enables the transmitter oscillator 2 and allows it to stabilize for 1 ms. The timing circuit 13 subsequently enables the RF amplifier 3 by sending a keying signal to the keying input. The RF energy from the RF amplifier 3 is filtered by bandpass filter 4 to reduce spurious RF emissions. The filtered signal is passed to a PCB foil micropatch 2 dBi gain antenna 5 which radiates the RF energy to an appropriate receiver. When the timing circuit 13 keys the RF power amplifier 3 it also begins to recirculate the spread spectrum 31 chip code stored in recirculating register 10 at a chip rate of 1 to 1.3 MHz. The chip code in turn causes a voltage swing 0–5 volts at the modulation input of the microprocessor. The voltage swing in conjunction with a modulation setting second resistor R7 creates a proportional current which modulates voltage controlled oscillator 2 thereby generating a spread spectrum FSK signal. This improves the signal to noise ratio at the receiver by reducing required bandwidth and minimizes the chances for intersecting interference. The data is super imposed on the chip code by the resistor 6 as a 1/31 deviation of the total modulation. Two or three adjacent chip code sequences are used to equal one bit time resulting in a baud rate of 14–21 KB/s In order for a receiver to demodulate a spread spectrum chip code, it must time lock onto the spread spectrum chip code. Disclosed are three methods of this timing acquisition, one is serial and two are parallel assisted. All methods require some synchronization bits in the transmitted message specifically allocated to code timing acquisition, which allow the receiver to search the code and find a correlation peak. The serial correlator searches one bit time per chip in the code sequence to achieve a ±½ chip code lock. This search can be hastened by searching one code sequence time instead of one bit time thereby providing a two or three to one speed increase. The parallel correlator searches all 31 chip sequences in parallel so that an initial ±½ chip synchronization ("lock") can be achieved in one bit or one chip code sequence time. "Fine" code lock. (±¼ chip) for either serial or parallel assisted .schemes must be followed by transmitted bit times allocated to allowing the receiver to achieve a higher resolution correlation "time" lock. One quarter chip lock accuracies perform to within 1.25 dB of optimal code alignment. The receiver's fine code lock algorithm seeks to optimize the correlation peak. Higher levels of code lock can be achieved by searching in smaller fractions of a chip. This can facilitate "time of flight" distance or location measurement applications such that 25 ns, 25 feet, of measurement resolution can be achieved.

The transmitter's microprocessor 8 stores a synchronizing preamble in preamble register 11 of 36 bits for a serial correlator, which are broken into 31 bits for coarse lock 11 and 5 bits for fine lock 12. For the two parallel correlation methods disclosed 6 bits are used in the synchronizing preamble, 1 bit for coarse lock and 5 bits for fine lock. The actual code locking bits are transmitted as alternating ones and zeros so that the receiver's data demodulator can adaptively choose an optimal 1/0 voltage level decision point. The preamble is followed by a single data message synchronization bit 24 then 12 ID address bits 14 and 3 unit type bits 15 from address register 11, then 8 bits of input data from data register 18 and lastly 16 bits of CRC-16 data integrity check 19. The CRC-16 generator 19 is based on the entire proceeding message.

Once the message is transmitted, the timing circuit 13 turns off the enable signal at the enable input to voltage controlled oscillator 2 and the keying input of RF power amplifier 3, regenerates a new random number from random number generator 17, presets that number into the transmit interval wake-up circuit 9 and then sets the microprocessor 8 into the sleep mode. Battery voltage regulation is provided by a micropower regulator 1. Battery voltage is pulse tested to conserve battery life 25.

The CRC-16 generator can have its kernel seeded with an identification number unique to each facility. For example, the kernel can be set by the facility address. Any facility having a transmission system which uses such a unique code as the kernel for the CRC-16 generator can be separated from adjacent facilities without additional transmission time or message bits.

Receiver

The spread spectrum receiver comprises several major blocks:

A. The RF section which converts the received signal to lower frequencies;

B. Chip code generator with means of chip code phase shifting for correlation lock;

C. Means to measure both signal strength and quieting to detect correlation lock over the dynamic range of the system;

D. An adaptive data demodulator tolerant to DC i.e.: long strings of 1's or 0's; and E. microprocessor algorithms to perform the above.

Figure 3A:
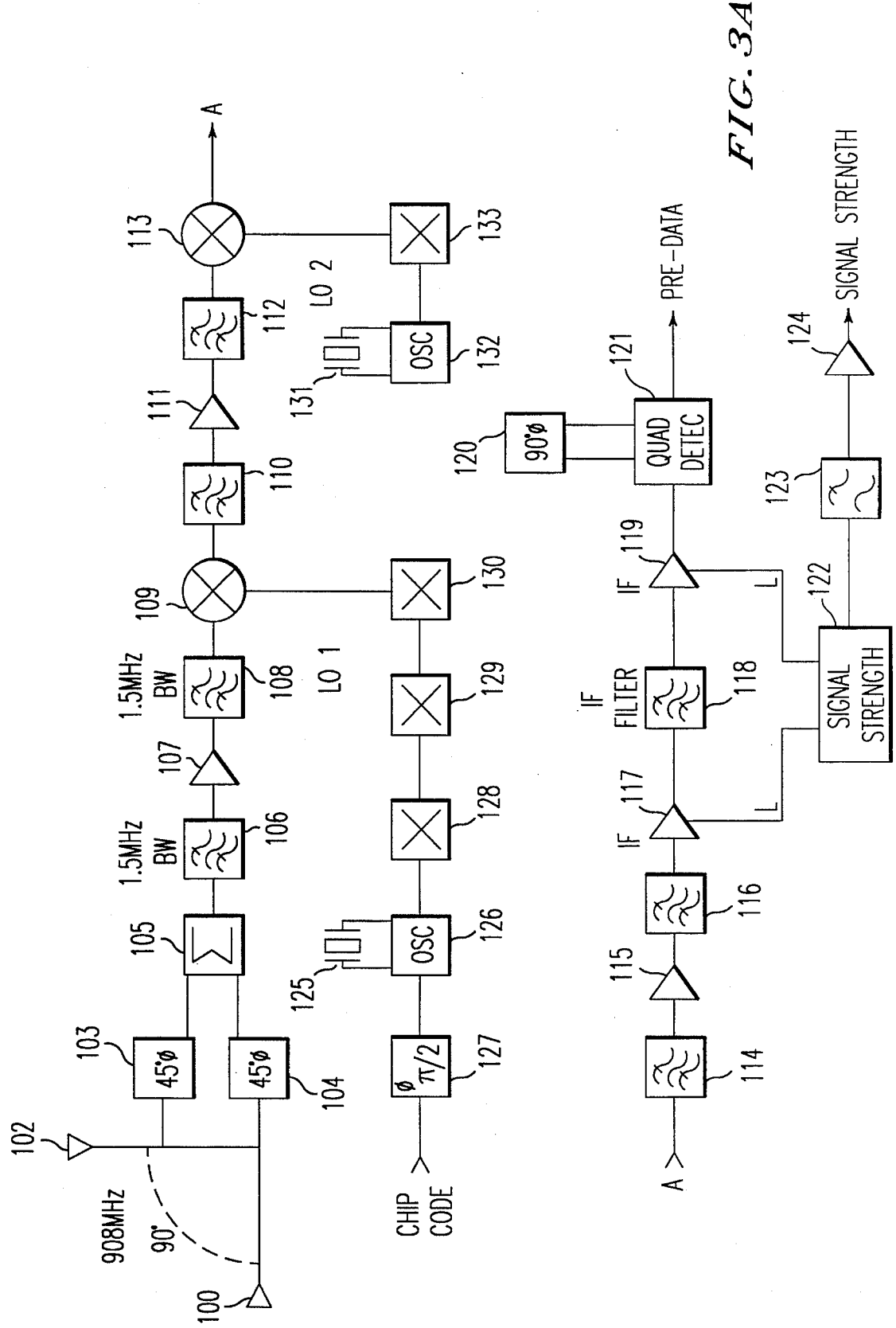
FIG. 3A is a block diagram of a spread spectrum receiver.
Figure 3B:
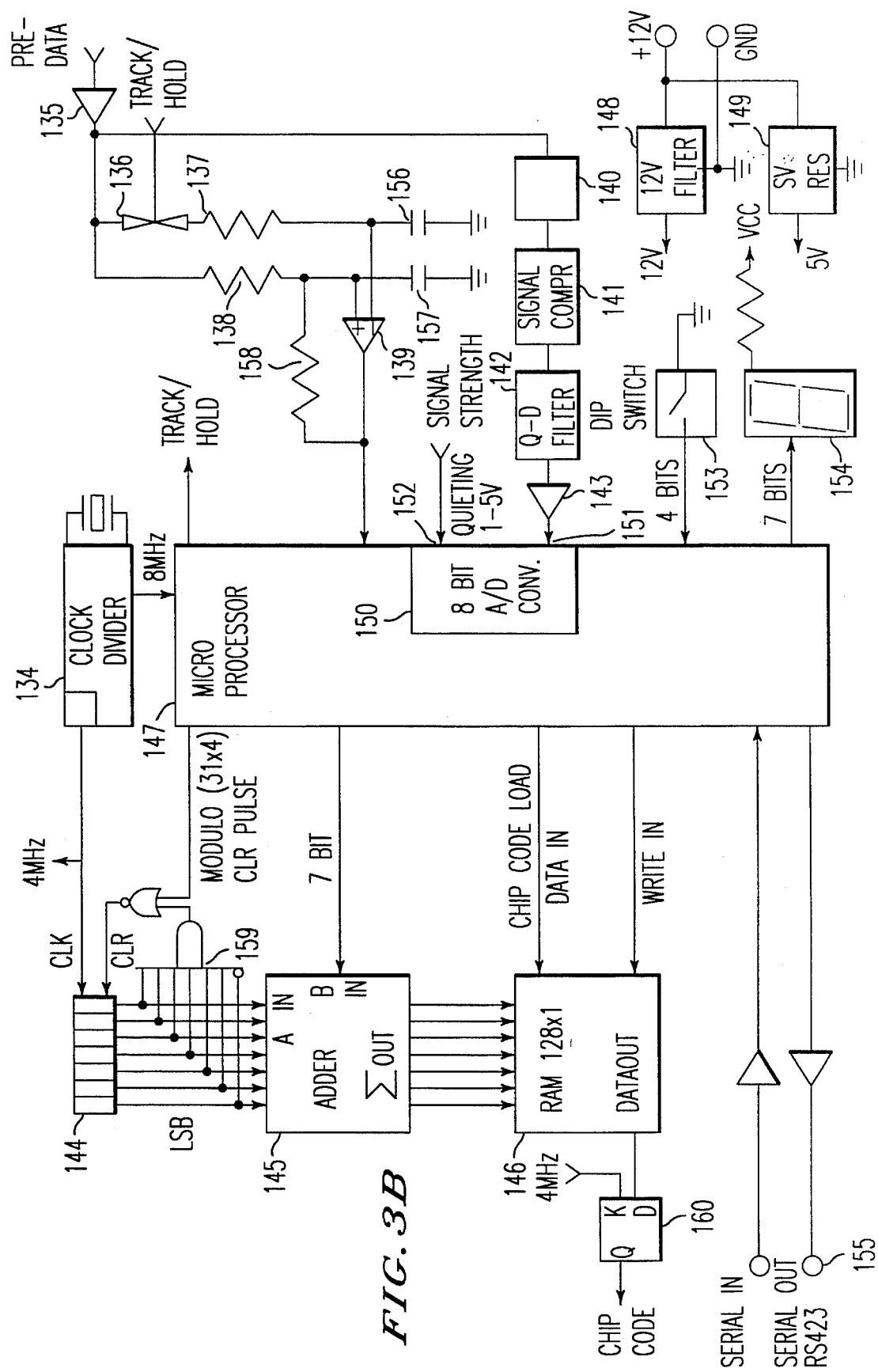
FIG. 3B is a schematic diagram of a spread spectrum chip code microprocessor of the receiver.

FIG. 3A shows the RF portion of the receiver which converts the received signal to lower frequencies. FIG. 3B shows a chip code generator with means for shifting a chip code phase for correlation lock, and means for measuring signal strength and the quieting output of the receiver to detect correlation lock over the dynamic range of the system. In FIG. 3A, a first polar diversity antenna 100 and a second polar diversity antenna 102 are shown and are physically turned so that their spatial phase relationship is 90°. Signals received from each of the first and second polar diversity antennas 100, 102 are passed through a 45° phase shifting network 104, 103, respectively and then to a combiner 105. The combiner 105 combines the signals received from the first and second polar diversity antennas 100, 102. The combined signal then passes through a first bandpass filter 106, is amplified by amplifier 107 and passed through a second bandpass filter 108, and is mixed with the mixer 109. Typically, a crystal 125 controls the frequency of an oscillator 126. The signal from oscillator 126 is frequency multiplied by first, second and third frequency multipliers 128, 129, 130. The signal is mixed at first mixer 109 with the received signal from second bandpass filter 108. The oscillator 126 is modulated by the spread spectrum chip code through a phase shifter 127. The spread spectrum chip code is generated by the circuit in FIG. 3B. First mixer 109 down converts the received signal to a first intermediate frequency signal. The first intermediate frequency signal is in a first intermediate frequency range, and is passed through third bandpass filter 110, amplified by second amplifier 111 and passed through fourth bandpass filter 112. The output signal from bandpass filter 112 is mixed with a second mixer 113 with a second oscillator signal from second oscillator 132 to a second intermediate frequency. The frequency of the second oscillator 132 is controlled by second crystal 131 and frequency multiplied by fourth frequency multiplier 133. The second intermediate frequency signal is then passed through fifth bandpass filter 114, amplified by third amplifier 115, filtered by sixth bandpass filter 116, and amplified by fourth amplifier 117. The second intermediate signal then .passes via two routes. The first route passes through seventh bandpass filter 118, fifth amplifier 119 and, quadrature detector 121. The quadrature detector 121 is coupled to a 90° phase shift network 120. The output of the quadrature detector 121 is the pre-data. Taps are taken from fourth and fifth amplifiers 117, 119. Signals from these taps pass through signal strength combiner 122, pass through eighth bandpass filter 123 and sixth amplifier 124. The output of sixth amplifier 124 is the signal strength.

Referring to FIG. 3B, an apparatus, which is embodied as a microprocessor 147 is shown for synchronizing a spread spectrum chip code using a two step algorithm in a microprocessor coupled to the pre-data output of the receiver. The signal from the pre-data output of the receiver passes through circuitry for generating a quieting output of the receiver.

The signal from circuitry coupled to the pre-data output, for generating the quieting output, includes amplifier 135, ninth bandpass filter 140, signal compressor 141, quadrature detector filter 142 to produce the quieting output from seventh amplifier 143. The output of seventh amplifier 143 is the quieting output, and passes to the microprocessor 147 through analog to digital converter 150. The pre-data signal also passes through a filter comprising fourth and fifth resistors 138, 137 operational amplifier 139 with sixth resistor 158, and first and second capacitors 157, 156. This signal is fed to the microprocessor 147.

The microprocessor 147 further includes means coupled to the correlation means for computing the adaptive average in response to the amplitude of the first data signal not exceeding the preset margin by adding the amplitude of the first data signal to the previously computed adaptive average. The microprocessor 147 comprises means coupled to the quieting output of the receiver via amplifier 143 for correlating the amplitude of a second data signal in response to the amplitude of the first data signal exceeding the preset margin. The second data signal is from the quieting output of the receiver. The first data signal is the digitized amplitude of the first signal, and the second data signal is the digitized amplitude of the second signal. When correlating the second data signal, the microprocessor 147 compares multiple iterations of the spread spectrum chip code, by comparing the second data signal to the adaptive average by a preset margin to determine whether the amplitude of the second data signal exceeds the preset margin.

The microprocessor 147 synchronizes the spread spectrum chip code by comparing the first signal during one information bit to an adaptive average to determine whether coarse correlation has been achieved. In response to the first signal not achieving coarse correlation, the microprocessor 147 computes an adaptive average by adding a first portion of the first data signal to a second portion of the adaptive average. Additionally, the microprocessor 147 correlates a second signal in response to the amplitude of the first signal exceeding the adaptive average by a preset margin to within a portion of one chip of the spread spectrum chip code by comparing the amplitude of the second signal to the adaptive by a preset margin to determine whether the second signal exceeds the preset margin.

The microprocessor 147 also generates a spread spectrum chip code for use with the receiver, which is inputted through phase shifter 127 to oscillator 126 of FIG. 3A. The apparatus, which includes the microprocessor 147 and related circuitry, includes means for entering a spread spectrum chip code having n chips. The entering means may be embodied as hand terminal 153. Also, the apparatus includes memory means for storing chip words, which may be embodied as random access memory 146. The random access memory 146 is coupled to the microprocessor 147. The random access memory 146 stores each chip word having a plurality of bits per chip. In a preferred embodiment, there are four bits per chip word. The apparatus further includes counting means coupled to the random access memory 146 for sequencing through n addresses of the chip words in the random access memory 146 and sequentially outputting the chip words to the receiver. The counting means may be embodied as adder 145 and timing circuit 147 with AND gate 159 for determining when to roll over when counting through n chip words. Clock divider 134 is included for controlling the microprocessor 147.

In operation, the RF energy is received by two polar diversity antennas 101 and 102 which are physically rotated 90 degrees, then phase shifted +45 degrees by the first phase shifter 103, and −45 degrees by the second phase shifter 104 and finally summed 105. This polar diversity method enhances faded area reception. The signal is bandwidth limited to 2.0 MHz by a first bandpass filter 106, amplified by first amplifier 107 and bandpass filtered by second bandpass filter 108 before being presented to the first mixer 109.

The first local oscillator generated by a crystal controlled oscillator 126 which is then phase modulated to the equivalent frequency pull of a modulation of 90° at a rate set by the chip code generator.

The chip code is initially selected by either the hand terminal 153 or by the remote serial port 155. Four chip code sets are loaded into the RAM 146 such that a single "1" is represented as "1111", this allows sub chip code searches by sequencing the two low order ram address bits. The ram memory is addressed at four times the chip rate so that ¼ chip resolution code searches can be performed. The counter 144 in conjunction with the clock input 156 sets this chip code rate. The binary counter 144 causes the RAM 146 to sequentially select and modulo repeat the entire stored chip code. The AND gate 59 determines the 31st count state ×4 to create a reset pulse and causes the counter to cycle through (31×4) modulo states. In order to rapidly jump to any chip code table position the summer 145 is used to add offset 161 selected by the microprocessor's search algorithm. The flip-flop 160 synchronizes the output of the RAM 146 to the chip code clock 156 to avoid variable propagation delays due to the counters and adders.

Once the chip code has modulated the oscillator 126, the combined signal is multiplied by 128, 129, and 130 to provide a signal from the first local oscillator to frequency mixer 109. This mixing stage 109 provides several features including lowering the frequency to 160 MHz, narrowing the bandwidth to 125 kHz, and when the microprocessor locks the code sequence, the mixer 109 despreads the original transmitted data signal.

The first mixer 109 output is bandpass filtered by third bandpass filter 110, amplified by second amplifier 111 and bandpass filtered by fourth bandpass filter 112. The first intermediate frequency signal is mixed by second mixer 13 with a signal from the second local oscillator. The second local oscillator signal originates from second oscillator 132 and is controlled by crystal 131. The resulting sine wave is frequency multiplied by fourth frequency multiplier 133 before being mixed at second mixer 113. The signal resulting from the second mixer 113 is lowered in frequency to 10.7 MHz and is bandpass filtered by fifth bandpass filter 114, amplified by third amplifier 115 and bandpass filtered by sixth bandpass filter 116. This signal is sent to fourth amplifier 117 with feedback bias current measured along with fifth amplifier 119 by a signal strength measurement circuit 122. The signal strength measurement is low pass filtered by first lowpass filter 123: and buffered by sixth amplifier 124 before passing to the signal strength analog multiplexer input 152.

The signal from fourth amplifier 117 is filtered by sixth bandpass filter 118 and amplified by fifth amplifier 119. This output of fifth amplifier 119 is then quadrature detected with the aid of phase shifting circuit 120. The output of the quadrature detector 121 is buffered by amplifier 135, then high pass filtered 140. The signal is compressed to a manageable 45 dB dynamic range by compressor 141. The compressed signal is passed through a quieting detector filter 142 and buffered by amplifier 143 before being inputted to the analog multiplexer input 151.

The "pre-data", buffered by amplifier 135, is also presented to an adaptive data demodulator. Varying DC levels will be present on this signal due to frequency uncertainty between the receiver and transmitters. The data 1/0 decision threshold is chosen as the average voltage of an alternating 1/0/1 . . . pattern in the synch preamble. During the preamble code lock search time, the analog switch 136 is enabled and pre charges capacitor 156 through resistor 137. This places an average voltage on capacitor 156 between a logic "1" and a logic "0". Once code lock is achieved, and the data message synchronization bit 24 is detected, the analog switch 136 is opened leaving the capacitor 156 at a stable level for the duration of the message. The buffered pre-data level is then filtered 157 with hysteresis set by resistors 158 and 138 and compared to the voltage level on capacitor 156. This results in reliable data bits provided on the output of voltage comparator 139.

Code Locking Algorithm

The code locking algorithm seeks to determine a correlation peak by comparing the received RF signal energy to a microprocessor controlled copy of the desired chip code pattern. The code locking algorithm digitizes the quieting detectors analog output once per bit time. The software maintains an adaptive average of the quieting samples to determine the level of correlation improvement. The described algorithm code locks to within ¼ chip time or within 1.25 dB of optimum. The baseband output also can be used in place of the quieting output.

Figure 4:
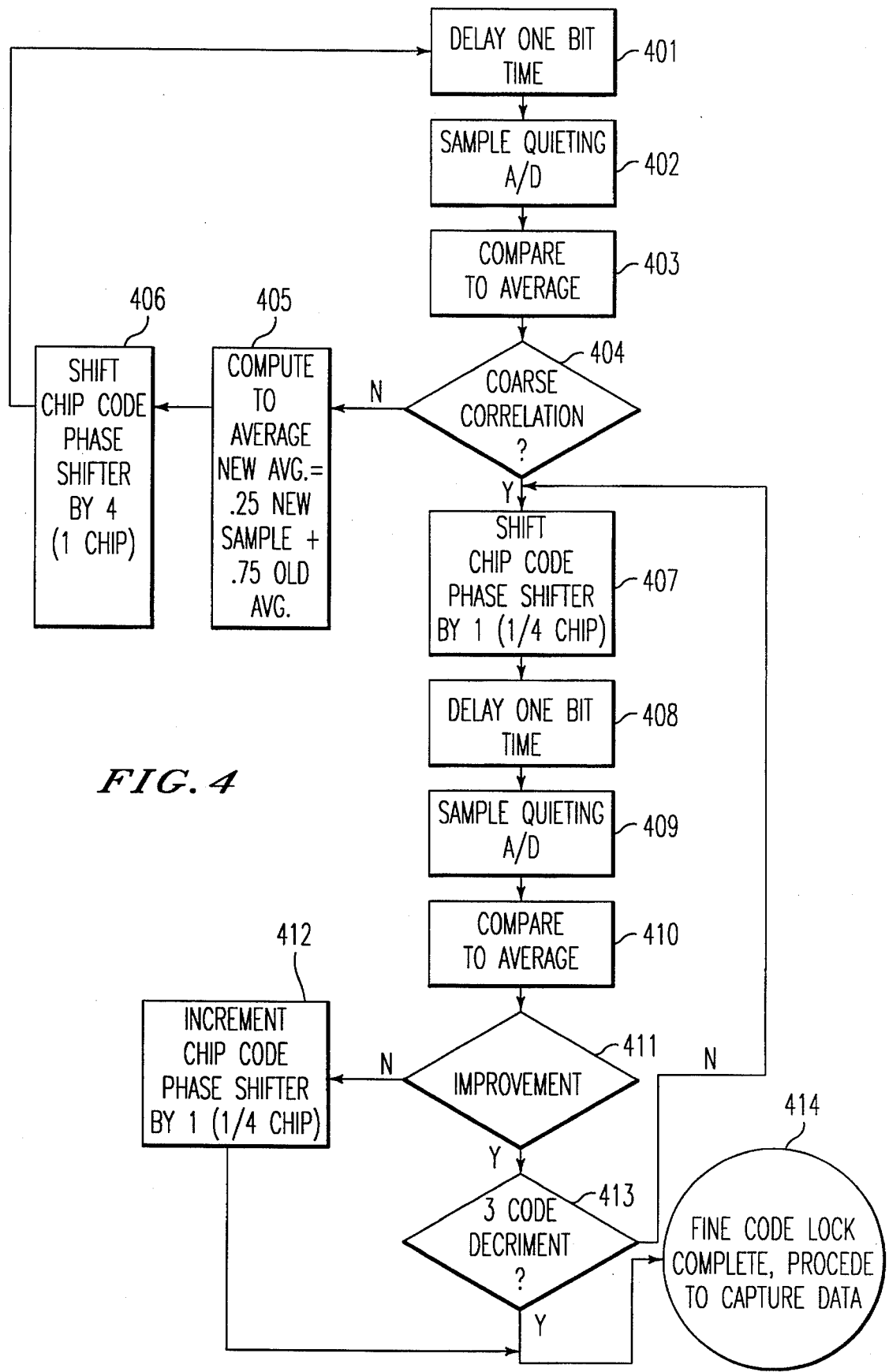
FIG. 4 is a flow chart of the code locking algorithm.

The present invention includes three methods of using a microprocessor for synchronizing the timing acquisition of a spread spectrum chip code received by the receiver. The spread spectrum signal comprises a plurality of information bits. Each information bit is spread in spectrum by a plurality of chips from a spread spectrum code. The first method, as depicted in FIG. 4, comprises the steps performed by the microprocessor of inserting 401 a delay of one information bit time before the first information bit received by the receiver, and sampling and digitizing 402 the first signal from the quieting output of the receiver to generate a first data signal. The sampling and digitizing alternatively can be taken from the baseband or signal strength output of the receiver. The first method compares 404 the amplitude of the first data signal to the adaptive average during the time of one information bit to determine whether coarse correlation has been achieved. In response to coarse correlation not being achieved, the method computes 405 the adaptive average by adding a first portion of the amplitude of the first data signal to a second portion of the previously computed adaptive average. If the coarse correlation has been achieved, then the method shifts 407 the chip code by a third portion of one information bit time. In a preferred embodiment of the present invention, the chip time is divided into four portions, thus the shifts 407 is equivalent to delaying the chip by ¼ chip time duration.

An additional delay is inserted 408 and the method samples and digitizes 409 a second signal from the quieting output of the receiver to generate a second data signal. The amplitude of the second data signal during one information bit time is compared 410 to the adaptive average to determine whether fine correlation has been achieved. If fine correlation has been achieved, then a data capture algorithm is initiated 414. If fine correlation has not been achieved, then the method shifts 412 the chip code phase shifter by a third portion, which is equivalent in the present preferred embodiment to a ¼ time duration of a chip. The method then proceeds to initiate the data capture algorithm.

A delay 401 is inserted before digital conversion of the quieting output 402. This delay serves to insure re- occurring data samples equal to one information bit time. The new sample is compared to the running adaptive average 403. If the improvement is greater than a preset margin, then coarse correlation 404 is achieved. Otherwise, if the new sample is within the noise error of the running average, the new sample is combined with the old average 405; average=(0.25 new+0.75 old average). The chip code phase shifter 161 is incremented by a count of 4 (1 chip time). This coarse code lock algorithm is then indefinitely repeated until coarse code lock is acquired.

If coarse correlation is achieved 404, then the algorithm seeks to "fine" code lock. The chip code phase shifter 161 is shifted 407 by one (¼ chip time). The one information bit time synchronizing delay is passed 408. The quieting detector output is digitized 409 and compared 410 to the running quieting output average. If the new sample did not improve 411 the quieting by the preset margin then the chip code phase shifter is incremented 412 by ¼ chip to its past more optimum position. Fine lock is completed 414 and the code lock algorithm jumps to a data capture algorithm.

If the required margin of quieting, improvement is achieved 411, then the number of chip code shifts is checked 413. Any search code position which is shifted more than three ¼ chip steps would undesirably slip one whole code cycle. Comparison 413 stops a search on the third-code slip and assumes an optimum correlation is achieved then proceeds to the data acquisition algorithm 414. If three code phase decrements have not occurred, the algorithm repeats at shift 407.

Figure 5:
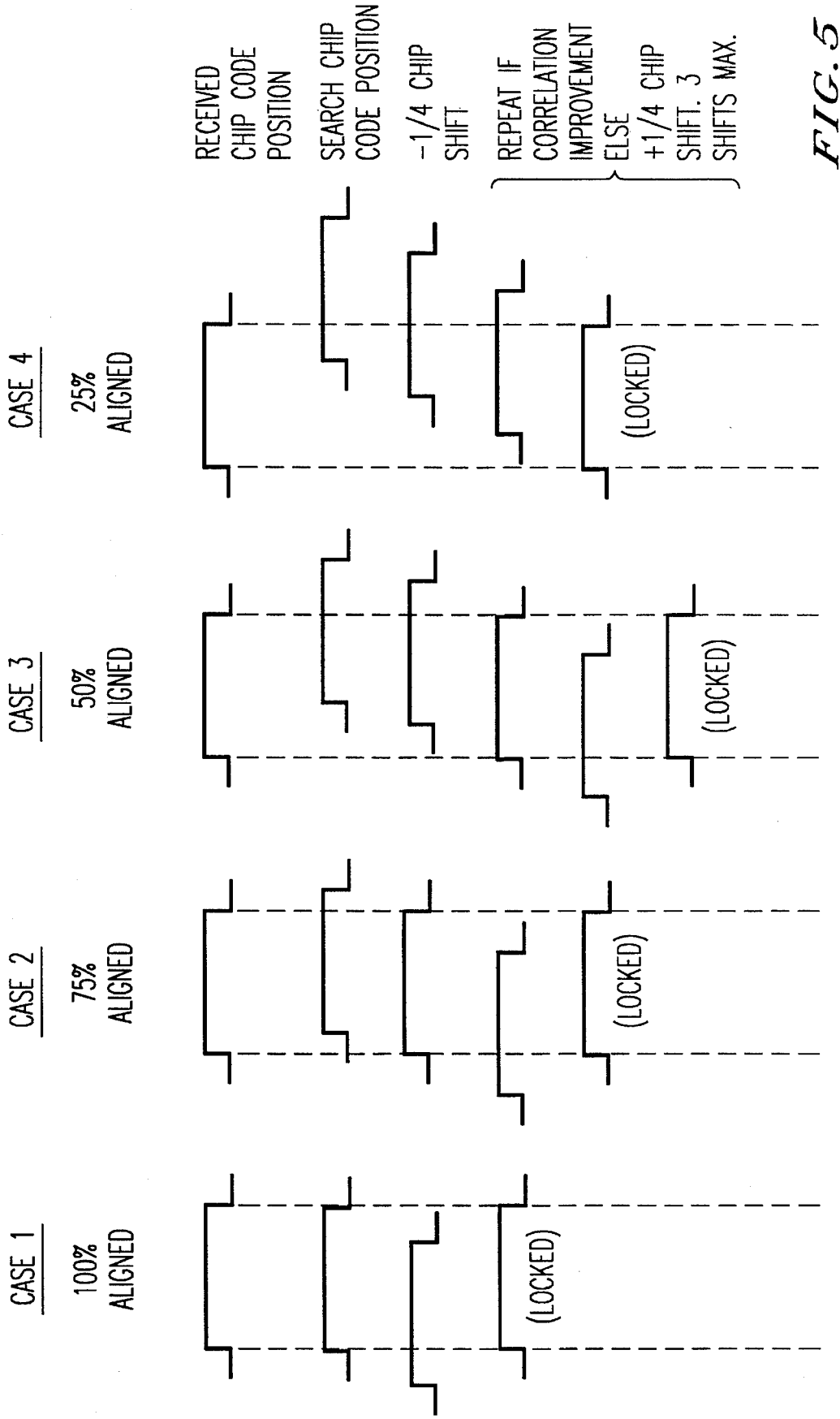
FIG. 5 is a timing diagram of the spread spectrum chip positions.

FIG. 5 shows four cases with one-quarter chip code lock achieved in each case using the first method.

Figure 6:
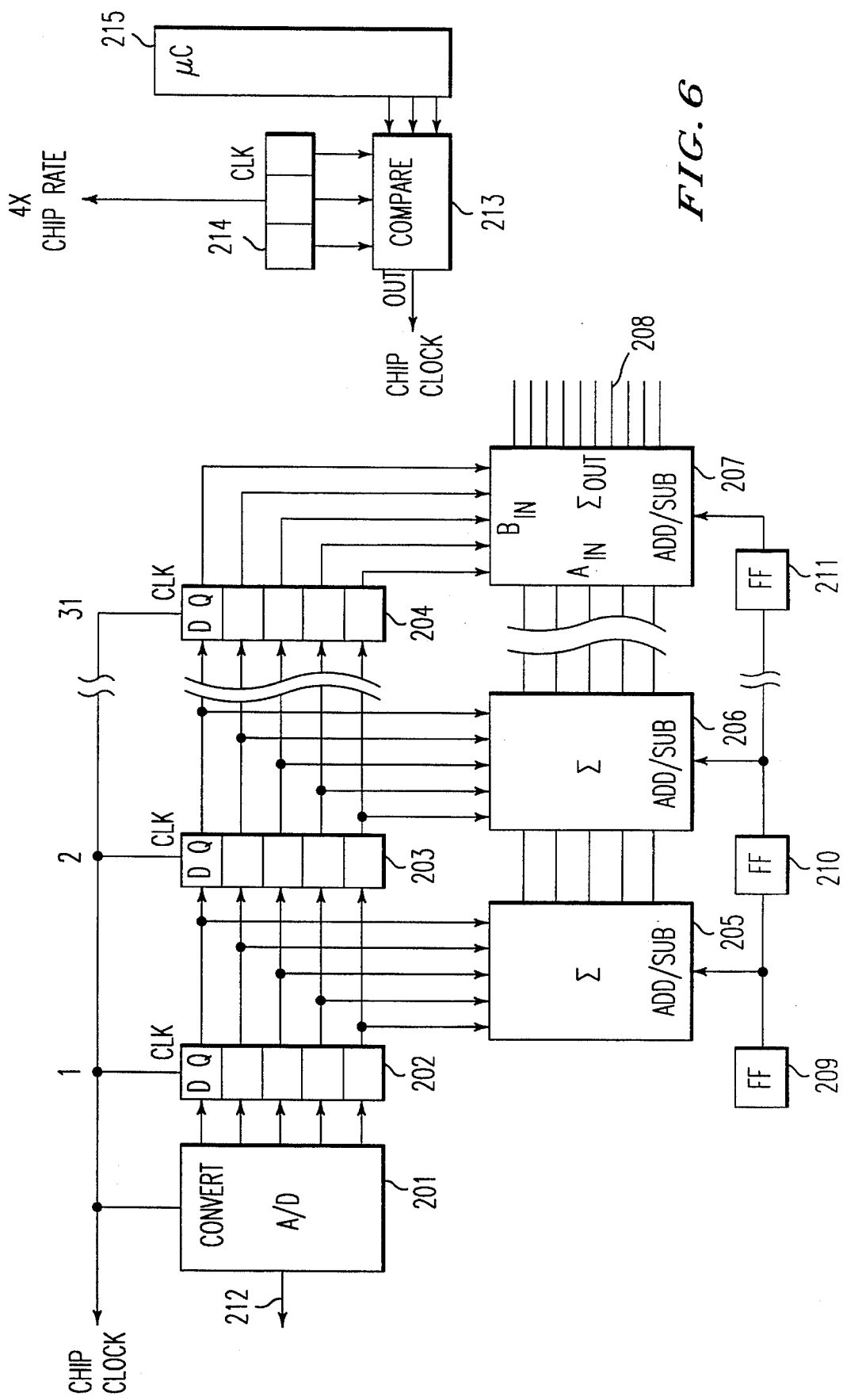
FIG. 6 is a schematic diagram of a parallel correlator coarse lock dither circuit for proving a fine lock.

A second method and apparatus for synchronizing a spread spectrum chip code using the baseband signal output of the receiver is shown in FIG. 6. The apparatus aspect of the invention includes means for sampling and digitizing a plurality of analog baseband signals, register means for shifting the plurality of data signals, means for adding in parallel the plurality of data signals, means for comparing the correlation sum and means for dithering a chip/sample clock by a portion of a chip time. The sampling and digitizing means may be embodied as analog to digital converter 201. The register means may be embodied as the plurality of registers 202, 203, 204. The adding means may be embodied as adders 205, 206, 207 and the comparing means may be embodied as comparator 213. The dithering means may be embodied as the microprocessor 215.

As illustratively shown, the apparatus for synchronizing the spread spectrum chip code has the analog to digital converter 201 coupled to the RF baseband output of the receiver 212. The analog to digital converter 201 samples and digitizes the plurality of analog baseband signals from the baseband output of the receiver 212 and generates a plurality of data signals. The plurality of registers 202, 203, 204 is coupled to the analog to digital converter 201 and shifts the plurality of data signals sequentially through the plurality of registers 202, 203, 204. The plurality of adders 205, 206, 207 are coupled to the plurality of registers 202, 203, 204, respectively, for adding in parallel each of the data signals stored in the plurality of registers 202, 203, 204 according to a plurality of predetermined weights for each of the plurality of data signals, respectively, to generate a correlation sum. The weights are controlled by flip flop circuits 209, 210, 211, which contain the spread spectrum chip code. The adder 207 outputs a correlation sum 208 to a comparator 213 for comparing the correlation sum to a predetermined margin or threshold. The dithering circuit embodies as a microprocessor 215 is coupled to the comparator 213 and dithers the chip clock by at least a first portion of one chip time, thereby improving chip lock.

In operation, the second method of using a microprocessor for synchronizing the timing acquisition of the spread spectrum chip code received by a receiver comprises the steps of sampling and digitizing using the analog to digital converter 201, the plurality of analog baseband signals from the baseband output of the receiver 212, to generate a plurality of data signals. Each of the analog baseband signals is sampled and digitized during one chip time. The method shifts the plurality of baseband signals through the plurality of shift registers 202, 203, 204. The plurality of data signals are added in parallel according to a plurality of predetermined weights, from flip flops 209, 210, 211 for each of the plurality of data signals, respectively, in the plurality of adders 205, 206, 207 to generate a correlation sum 208. The correlation sum 208 is compared to a predetermined threshold or preset margin, and a chip clock is then dithered by at least a first portion of one chip time to improve clock lock. In a preferred embodiment, the first portion is one quarter of one chip time The chip clock samples once per chip time. A coarse chip lock may therefore be incorrect by ±½ of a chip. To improve the lock, the chip clock is slewed in ±¼ and/or ±⅛ chip steps controlled by an algorithm in microprocessor 215. A clock with a rate equal to four times the chip rate is counted by counter 214. The counters output is compared to an output of the microprocessor 215 equal to the code phase being searched. The microprocessor 215 can thereby search in fine chip code steps after a rapid parallel assisted search in 1, 31 chip code time. The total search required is equal to 6 chip code times, which can be sent in the spread spectrum transmitters code-lock preamble as disclosed.

As a further component reduction of the circuitry described above in the second species of the method and apparatus for synchronizing a spread spectrum chip code, the parallel assisted chip code lock can be serially summed instead of parallel summed. The serial sum of all 31 stages must be computed between chip samples (less than 1,000 ns). This speed can be achieved with available high speed CMOS ASICS with clock speeds of 40 MHz or greater.

Figure 7:
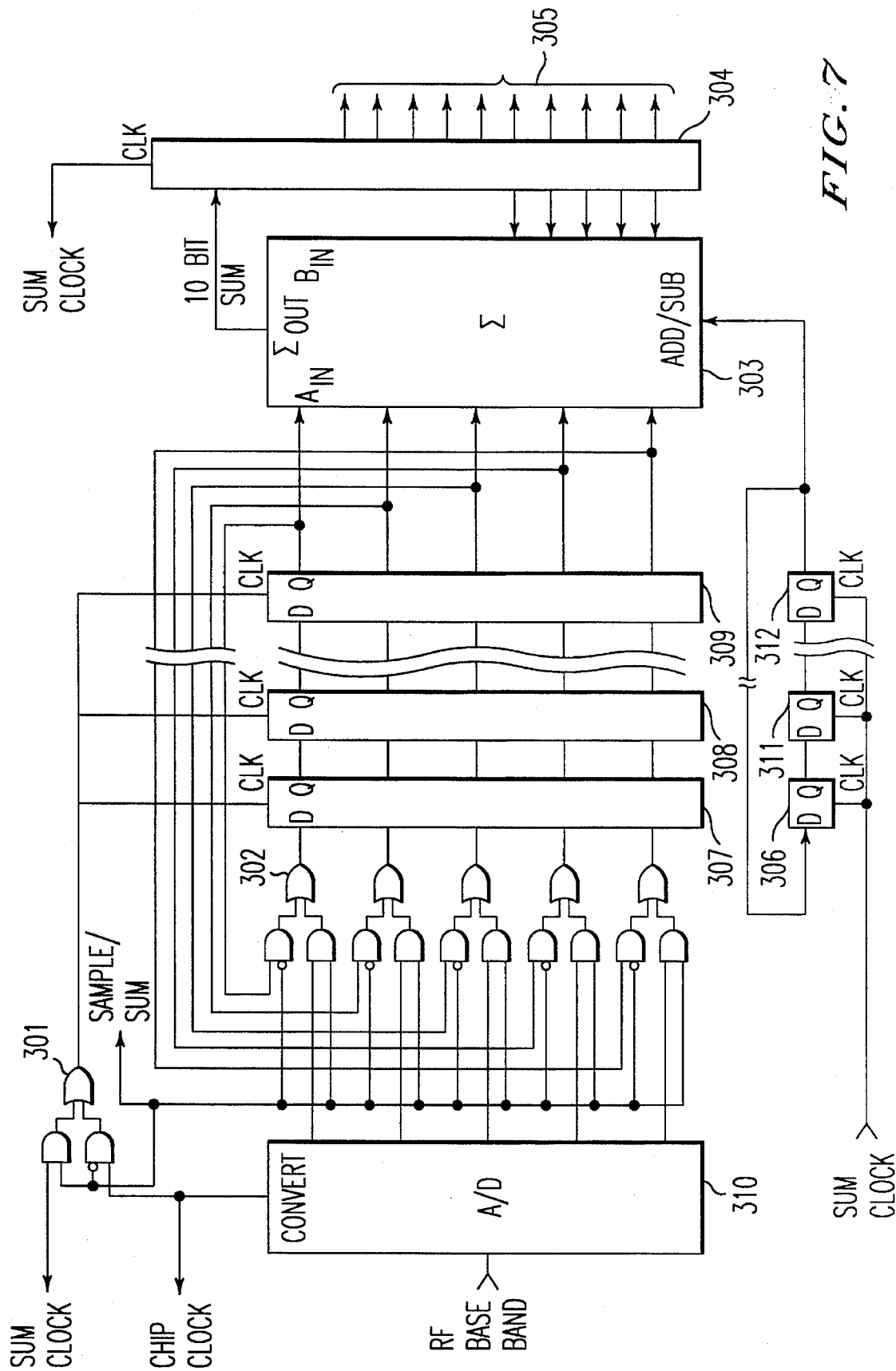
FIG. 7 is a schematic diagram of a parallel correlator with a serial correlation sum accumulation.

A third species of the spread spectrum chip code synchronizing method and apparatus is disclosed in the present invention, and is set forth in FIG. 7. The third species of the spread spectrum chip code synchronizing apparatus couples to the baseband output of the receiver. The apparatus includes means coupled to the baseband output of the receiver for sampling and digitizing the plurality of analog baseband signals, register means coupled to the sampling and digitizing means for shifting and recirculating the plurality of data signals, and means coupled to the register means for adding sequentially the data signals passing through the shift register means. As shown in FIG. 7, the sampling and digitizing may be embodied as analog to digital converter 310. The register means may be embodied as registers 307, 308, 309 and the adding means may be embodied as ladder 303. As shown in FIG. 7, the analog to digital converter 310 is coupled to the baseband output of the receiver, and passes through a plurality of gates 302 to the plurality of registers 307, 308, 309, to adder 303. Also shown is a plurality of flip flops 306, 311, 312 having the spread spectrum chip code therein. The flip flops 306, 311, 312 input the spread spectrum chip code into the adder 303. The adder 330 is coupled to a correlation sum accumulator 304 which outputs a correlation sum 305.

In the preferred embodiment, the third species of the apparatus for synchronizing the spread spectrum chip code has the analog to digital converter 310 coupled to the baseband output of the receiver for sampling and digitizing a plurality of analog baseband signals and generating a plurality of data signals. Each of the analog baseband signals is sampled and digitized during one chip time. The plurality of registers 307, 308, 309 is coupled to the analog to digital converter 310 through gates 302 for shifting and recirculating the plurality of data signals sequentially through the plurality of registers 307, 308, 309 and gates 302. The adder 303 is coupled to register 309 for adding sequentially the data signals passing through registers 309 according to predetermined weights set forth in flip flops 306, 311, 312.

In operation, the third method of uses a microprocessor for synchronizing the timing acquisition of the spread spectrum chip code received by the receiver. The method samples and digitizes the plurality of analog baseband signals from the baseband output of the receiver using analog to digital converter 310, to generate a plurality of data signals. Each of the analog baseband signals is sampled and digitized during one chip time. The method further includes shifting and recirculating the plurality of data signals sequentially through the plurality of registers 307, 308, 309. The data signals are added sequentially as they pass through register 309 using adder 310 and accumulated. The correlation sum accumulator 304 then passes the correlation sum 305 to the microprocessor.

The third method is similar to the second method, except that there is only one adder 303 for the entire register chain instead of one adder per stage. The registers 307, 308, 309 are steered to recirculated by the AND/OR gates 302. The stored chip code string can also be shifted and recirculated. After each chip clock rising stage transition, an analog data sample is converted by analog to digital converter 310 and stored in register 307. Data in the registers are shifted to the right as in the circuit in of FIG. 6. Immediately following the chip sample, a sequence is performed to accumulate a correlation sum. The AND/OR steering gates 301 and 302 are switched to the "sum" state. This passes a high speed summing clock of 40 MHz for 31 clock cycles to the registers 307, 305, 309 and to the stored spread spectrum chip code in 306, 311, 312. The steering gates 302 causes data in registers 307, 305, 309 to recirculate so that after 31 clock cycles of the adding phase, the data in registers 307, 308, 309 will be in their original positions and ready to accept another spread spectrum chip code data sample and store phase. After each 40 MHz summing clock transition a new sum is generated by adder 303 and accumulated in accumulator 304. Adder 303 is caused to either add or subtract the inputs Ain from the accumulated total. This is determined by the stored chip code string in flip-flop 312 which creates the x (+1) or x (−1) correlation weighting causing either the addition or subtraction of the Ain inputs. The outputs of accumulator 304 are transferred to the next register stage and then at the next clock rising edge, the accumulator stores that total. After 31 summing clock cycles the accumulation 304 will contain the correlation sum 305. The multibit words stored and summed by the two alternative methods can be reduced to one bit samples and sums, resulting in a small loss of performance.

It will be apparent to those skilled in the art that various modifications can be made to the wireless detection system of the instant invention without departing from the spirit or scope of the invention, and it is intended that the present invention cover modifications and variations of the wireless detection system provided they come within the scope of the appended claims and their equivalents.

We claim:

1. A spread spectrum chip code synchronization apparatus, coupled to a baseband output of a receiver, the spread spectrum chip code synchronization apparatus comprising:

means coupled to the baseband output of said receiver for sampling and digitizing a plurality of analog baseband signals, from the baseband output of said receiver, as a plurality of data signals, wherein each of the analog baseband signals is sampled and digitized as one of the plurality of data signals during one chip time;

register means, including a plurality of shift registers, said register means coupled to said sampling and digitizing means, for shifting the plurality of data signals sequentially through the plurality of shift registers; and means coupled to said register means for adding in parallel each of the plurality of data signals stored in said plurality of shift registers with a respective one of a plurality of weights, as a respective result, and for adding sequentially the results as a correlation sum for attaining chip code synchronization.

2. The apparatus as set forth in claim 1 further including means coupled to said adding means for comparing the correlation sum to a predetermined threshold.

3. The apparatus as set forth in claim 2 further including means coupled to said comparing means for dithering a chip clock by at least a first portion of one chip time, thereby attaining a clock resulting in chip code synchronization.

4. The apparatus as set forth in claim 3 further including means for storing a spread spectrum chip code as the plurality of predetermined weights.

5. A method of using a processor for synchronizing the timing acquisition of a spread spectrum signal received by a receiver, comprising the steps of:

sampling and digitizing a plurality of analog baseband signals from a baseband output of said receiver, to generate a plurality of data signals, wherein each of the analog baseband signals is sampled and digitized during one chip time;

shifting the plurality of data signals sequentially through a plurality of shift registers;

adding in parallel each of the plurality of data signals stored in said plurality of shift registers with a respective one of a plurality of weights, as a respective result, and for adding sequentially the results as a correlation sum; and using the correlation sum to attain chip code synchronization.

6. The method as set forth in claim 5 wherein the step of using the correlation sum includes the step of comparing the correlation sum to a predetermined threshold.

7. The method as set forth in claim 6 wherein the step of using the correlation sum includes the step of dithering a chip clock by at least a first portion of one chip time, thereby attaining a clock lock, resulting in chip code synchronization.

8. A spread spectrum chip code synchronization apparatus, coupled to a baseband output of a receiver, the spread spectrum chip code synchronization apparatus comprising:

means coupled to the baseband output of said receiver for sampling and digitizing a plurality of analog baseband signals from the baseband output of said receiver, to generate a plurality of data signals, wherein each of the analog baseband signals is sampled and digitized during one chip time;

register means, including a plurality of shift registers, said register means coupled to said sampling and digitizing means for shifting and recirculating the plurality of data signals sequentially through the plurality of shift registers; and means coupled to said register means for adding sequentially the data signals passing through one of the shift registers with a respective one of a plurality of predetermined weights, as a respective result, and for adding sequentially the results as a correlation sum for attaining chip code synchronization.

9. The apparatus as set forth in claim 1, 2, 3, 4, or 8 wherein said register means includes a recirculating register.

10. The apparatus as set forth in claims 1, 2, 3, 4, or 8 further including means for synchronizing the baseband samples so that there is one sample per chip time in place of Nyquist oversampling.

11. A method of using a processor for synchronizing the timing acquisition of a spread spectrum signal received by a receiver, comprising the steps of:

sampling and digitizing a plurality of analog baseband signals from a baseband output of said receiver, to generate a plurality of data signals, wherein each of the analog baseband signals is sampled and digitized during one chip time;

shifting and recirculating the plurality of data signals sequentially through a plurality of shift registers;

adding sequentially the data signals passing through one of the shift registers according to a predetermined weighting algorithm to generate a correlation sum for attaining chip code synchronization.

* * * * *

UNITED STATES PATENT AND TRADEMARK OFFICE
CERTIFICATE OF CORRECTION

PATENT NO. : 5,598,427
DATED : January 28, 1997
INVENTOR(S) : James D. ARTHUR, et al.

It is certified that error appears in the above-indentified patent and that said Letters Patent is hereby corrected as shown below:

On the title page, item [*], the Terminal Disclaimer should read:

--[*] Notice:   The portion of the term of this patent subsequent to Feb. 28, 2011, has been disclaimed.--

On the title page and the top of column 1, item [62], the Related U.S. Application Data should read:

--[62]   Division of Ser. No. 569,682, Aug. 20, 1990, Pat. No. 5,095,493, which is a continuation of Ser. No. 266,461, Nov. 2, 1988, Pat. No. 4,977,577.--

Signed and Sealed this

Sixteenth Day of September, 1997

Attest:

BRUCE LEHMAN

Attesting Officer

Commissioner of Patents and Trademarks